United States Patent Office 2,768,839
Patented Oct. 30, 1956

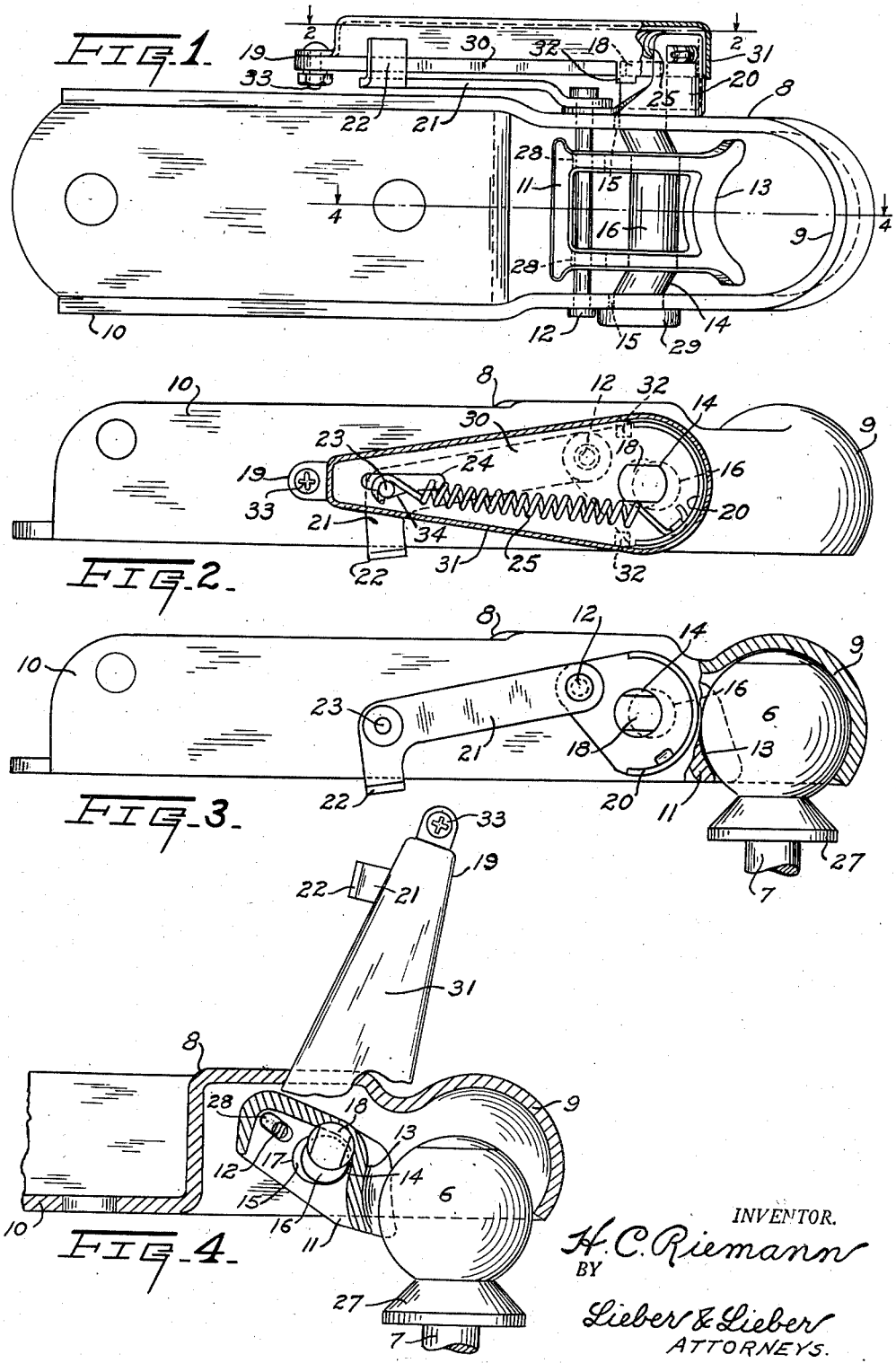

2,768,839

QUICK RELEASABLE AND WEAR COMPENSATING BALL AND SOCKET COUPLING

Howard C. Riemann, West Allis, Wis., assignor to The Fulton Company, West Allis, Wis., a corporation of Wisconsin Application July 10, 1953, Serial No. 367,197

3 Claims. (Cl. 280—512)

The present invention relates generally to improvements in vehicle couplings, and relates more specifically to improvements in the construction and operation of ball and socket type trailer couplings.

The primary object of my present invention is to provide an improved vehicle coupling which is simple, compact and durable in construction, and which is moreover highly efficient in operation.

Ball and socket type trailer couplings wherein a ball member attached to the rear of an automobile is universally movably cooperable with a socket member attached to the draft beam of a trailer, have long been in extensive use; and in most of these prior coupling units the ball member is normally confined within the socket of the complementary socket member by means of a retainer adapted to be released with the aid of a hand wheel or the like so as to permit separation of the ball and socket members and uncoupling of the trailer. While these previous trailer coupling units are quite satisfactory during normal operation, and some are adapted to be periodically manually adjusted by manipulation of the hand wheel to compensate for wear between the ball and socket, they are relatively difficult to couple and uncouple and to adjust for wear compensation purposes, thus making the prior devices quite objectionable especially if quick coupling and releasing of the parts is desirable.

It is therefore an important object of the present invention to provide an improved ball and socket type of trailer coupling wherein the ball and socket members are adapted to be quickly coupled and uncoupled.

Another important object of this invention is to provide an improved ball and socket draft coupling in which wear between the ball and socket is automatically compensated for at all times.

A further important object of my present invention is to provide a ball and socket trailer coupling having a releasable ball retainer, and wherein a simple device cooperable with the retainer functions to constantly compensate for wear between the parts while also being manipulatable to rapidly connect and disconnect the ball and socket.

Still another important object of the invention is to provide an improved ball and socket coupling assemblage comprising relatively few simple but sturdy parts which may be readily manufactured and which cooperate to produce a quickly connectable and releasable draft unit requiring minimum attention while in use.

An additional object of this invention is to provide an improved universal automobile-trailer coupling which is highly dependable in operation, and which is adapted to be coupled and uncoupled with minimum effort.

These and other more specific objects and advantages of my invention will be apparent from the following detailed description from which it will be noted that the gist of the improvement is the provision of instrumentalities associated with the ball retainer of a ball and socket type of trailer coupling, for performing the dual function of automatically compensating for wear on the parts and of effecting quick coupling and uncoupling of the complementary ball and socket members.

A clear conception of the features constituting the present improvement and of the construction and operation of a typical commercial ball and socket coupling embodying the invention, may be had by referring to the drawing accompanying and forming a part of this specification wherein like reference characters designate the same or similar parts in the various views.

Fig. 1 is a bottom view of the socket member of one of the improved ball and socket couplings, a small portion of the coupling and release handle having been broken away;

Fig. 2 is a part sectional side elevation of the same coupling member, the section having been taken along the line 2—2 of Fig. 1 and showing the latch pin of the toggle lever disposed in latching position;

Fig. 3 is another part sectional side elevation of the same coupling socket member with the ball releasing handle omitted, the section having been taken centrally through the ball receiving socket with the ball member confined therein; and Fig. 4 is a fragmentary longitudinal central vertical section through the improved coupling, showing a fragment of the ball releasing handle and the ball retainer in release position, the section having been taken along the line 4—4 of Fig. 1.

While the invention has been illustrated and described herein as having been embodied in a typical commercial ball and socket trailer coupling the major parts of which are formed of sheet metal, it is not the desire or intent to unnecessarily restrict the use of the improvement to such an assemblage; and it is also contemplated that specific descriptive terms employed herein be given the broadest possible interpretation consistent with the disclosure.

Referring to the drawing, the improved quickly releasable and wear compensating universal trailer coupling shown therein, comprises in general, a spherical ball member 6 having a depending shank 7 attachable to the rear of a draft vehicle; a socket member 8 having a spherical front socket 9 universally movably cooperable with the ball member 6 and also having a U-shaped rear portion 10 attachable to the forward draft tongue of a trailer; a ball retainer 11 pivotally suspended within the medial portion of the socket member 8 by means of a transverse pin 12 and having a spherical zone surface 13 cooperable with the socket 9 to normally maintain the ball within the socket; a cam shaft 14 journalled in elliptical bearings 15 formed in the opposite side walls of the socket member 8 and having a medial eccentric portion 16 cooperable with alined openings 17 in the retainer 11 while one of its ends 18 projects laterally beyond the member 8 and is flattened; a hollow handle 19 firmly secured to the flattened cam shaft end 18 and being swingable to rotate the cam shaft 14; a spring holder or retainer 20 pivotally suspended from the pin 12 and embracing the cam shaft 14; a lever 21 also pivotally suspended at one end from the pin 12 while its opposite end 22 projects outwardly laterally of the handle 19 and its medial portion carries a pin 23 projecting through a slot 24 formed in the handle; and a helical tension spring 25 connecting the pin 23 with the retainer 20 within the hollow handle 19.

The ball member 6 is provided with a flange 27 and may be formed of sheet metal with the aid of punches and dies as shown and described in copending application Serial No. 330,476, filed January 9, 1953, and the socket member 8 and the ball retainer 11 may also be formed of heavy sheet metal with spherical zone surfaces adapted to snugly engage the ball member 6 while the coupling is in use. The pivot pin 12 is permanently secured to the opposite side walls of the socket member 8, and the ball retainer 11 has elongated slots 28 therein through which the pin 12 extends and which permit the retainer to move toward and away from the socket 9 when the cam shaft 14 is oscillated. The openings 17 are also slightly elliptical in order to permit the shaft 14 to be inserted through the retainer 11 during assembly of the parts and to prevent possible binding, and the bearings 15 are likewise formed slightly elliptical so as to permit the retainer to float under the influence of the spring 25.

The cam shaft 14 has an integral head 29 at its end remote from the flattened end 18 thereof; and the inner plate 30 of the handle 19 and in which the slot 24 is formed, is formed of heavy sheet metal and is permanently secured to the flattened shaft end 18. The spring retainer 20 which is pivotally suspended from the pin 12 has an arcuate wall which projects outwardly beyond the inner rigid plate 30 of the handle 19, and one end of the spring 25 is hooked through this wall while the opposite spring end hooks over the lever pin 23. The tension spring 25 is enclosed by a cover 31 detachably secured to the plate 30 by means of lugs 32 and a bolt 33; and the spring 25 is adapted to be positioned beneath the pivot pin 12 so as to resiliently urge the retainer 11 toward the ball member 6 in order to compensate for wear on the ball and socket, and is also adapted to be swung upwardly across the fixed pivot pin 12 so as to hold the retainer 11 in released condition when the handle 19 is swung upwardly as in Fig. 4. The slot 24 which is formed in the handle plate 30 and within which the pin 23 carried by the lever 21 is adapted to ride, is also preferably provided with a lower notch 34 as shown in Fig. 2, which is adapted to engage the pin 23 in order to prevent the handle 19 from accidentally swinging into release position.

When the improved quick releasable and automatic wear compensating trailer coupling has been properly constructed and assembled as above described, and the ball and socket members 6, 8 have been firmly attached to a draft vehicle and trailer respectively, its operation is as follows. In order to connect the members 6, 8, the handle 19 should be swung upwardly about the bearings 15 so as to withdraw the ball retainer 11 from the socket 9 as in Fig. 4, thus permitting free lowering of the member 8 and upward insertion of the ball member 6 within the socket 9. After the ball has assumed the position shown in Fig. 3, the handle 19 may be swung downwardly to the position shown in Fig. 2, thereby rotating the cam shaft 14 in a counterclockwise direction and causing its crank or eccentric portion 16 to push the retainer 11 forwardly into resilient engagement with the sphere of the ball member 6 as the spring 25 is moved across the fixed pivot pin 12 to the position illustrated in Figs. 2 and 3.

With the parts in this position, the tension spring 25 will act upon the toggle formed by the lever 21 and the spring retainer 20 to constantly and automatically urge the retainer 11 into resilient engagement with the ball, thus compensating for wear between the ball member 6 and the socket 9 while still permitting free universal movement between these elements. The handle 19 will then normally remain in the position shown in Fig. 2 under the influence of the spring, but if the draft vehicle or the trailer are suddenly subjected to a severe bump and the handle 19 tends to fly upwardly from its normal position, then the latch pin 23 will be drawn into the lower notch 34 of the slot 24 and will positively arrest the upward swinging motion of the handle 19.

When it becomes desirable to release the coupling elements and to disconnect the members 6, 8, it is only necessary for the operator to press the flange 22 of the lever 21 upwardly and to simultaneously swing the handle 19 into the position shown in Fig. 4. This movement of the handle 19 rotates the cam shaft 14 in a clockwise direction and causes the eccentric portion 16 thereof to withdraw the retainer 11 from the socket 9 sufficiently to permit free upward removal of the socket member 8 while also moving the spring 25 upwardly across the fixed pivot pin 12. The spring 25 will then hold the handle 19 in coupling release position until this handle is again returned to horizontal position as in Figs. 1 and 2.

From the foregoing detailed description of the improved trailer coupling assemblage, it will be apparent that the present invention provides a coupling of the ball and socket type wherein the coupling members 6, 8 may be quickly separated or united, and in which wear on the ball and socket is automatically compensated for so as to eliminate undesirable looseness of parts. The lever 21 and the spring holder 20 cooperate with the tension spring 25 to provide a toggle which effectively resiliently urges the ball retainer 11 toward the socket 9 whenever the handle 19 is lowered, and the notch 34 formed in the slot 24 serves to positively prevent the handle from accidentally swinging into coupling release position. However, when the handle 19 is swung upwardly and forwardly as in Fig. 4, the spring 25 functions to hold it in coupling release condition, and the flange 22 formed on the lever 21 facilitates such swinging of the handle by preventing the pin 23 from entering the notch 34 while the handle 19 is being manipulated. The improved assemblage comprises releatively few simple but sturdy parts, and the invention has proven highly satisfactory and safe in actual use.

It should be understood that it is not desired to limit this invention to the exact details of construction and operation of the ball and socket coupling herein specifically shown and described, for various modfications within the scope of the appended claims may occur to persons skilled in the art.

I claim:

1. In a trailer coupling, a ball member, a socket member universally movably cooperable with said ball member, a ball retainer suspended by a guiding pivot from said socket member, a cam shaft having opposite ends journalled in said socket member and being provided with an integral medial cam loosely cooperable with said retainer to move the latter toward and away from said ball member, a handle secured to one of said shaft ends, toggle elements carried by said pivot, and a spring coacting with said elements and with said handle to constantly urge said retainer toward said ball member during normal use of the coupling, said handle being operable to cause said retainer to effect rapid separation of said members and one of said toggle elements being cooperable with the handle to release said spring during such rapid separation of the members.

2. In a trailer coupling, a ball member, a socket member universally movably cooperable with said ball member, a ball retainer suspended by a guiding pivot from said socket member, a cam shaft having opposite ends journalled in said socket member and being provided with an integral medial cam loosely cooperable with said retainer to move the latter toward and away from said ball member, toggle elements carried by said pivot, a spring coacting with said elements to constantly urge said retainer toward said ball member during normal use of the coupling, and a handle for effecting rotation of said shaft to cause said retainer to effect rapid separation of said ball and socket members, one of said toggle elements being cooperable with said handle and operable to release said spring during such rapid separation of the members.

3. In a trailer coupling, a ball member, a socket member universally movably cooperable with said ball member, a ball retainer suspended by a guiding pivot from said socket member, a cam shaft having opposite ends journalled in said socket member and being provided with an integral medial cam loosely cooperable with said retainer to move the latter toward and away from said ball member, a retainer retracting handle secured to one of said shaft ends, toggle elements suspended from said pivot, a tension spring connecting the ends of said elements remote from said pivot for rotating said shaft to cause said retainer to compensate for wear on said members, and means for releasing the spring tension when said handle is manipulated to release the retainer.

References Cited in the file of this patent

UNITED STATES PATENTS

| | | |
|---|---|---|
| 1,340,521 | Cadman | May 18, 1920 |
| 2,542,643 | Duncan | Feb. 20, 1951 |
| 2,590,201 | Nielsen | Mar. 25, 1952 |

FOREIGN PATENTS

| | | |
|---|---|---|
| 553,337 | Germany | June 24, 1932 |